United States Patent [19]

Rogers, Jr. et al.

[11] 4,153,274

[45] May 8, 1979

[54] WINDING PREVENTION BELT RETRACTOR FOR PASSIVE SHOULDER BELT SYSTEM

[75] Inventors: Lloyd W. Rogers, Jr., Utica; Edwin H. Klove, Jr., Bloomfield Hills, both of Mich.

[73] Assignee: General Motors Corporation, Detroit, Mich.

[21] Appl. No.: 864,270

[22] Filed: Dec. 27, 1977

[51] Int. Cl.² .......................................... B60R 21/02
[52] U.S. Cl. ................................. 280/745; 242/107.7
[58] Field of Search ...................... 280/744, 745, 747; 242/107.7, 107.4 A, 107.4 R, 107.4 E, 107.6, 297/388

[56] References Cited

U.S. PATENT DOCUMENTS

| | | | |
|---|---|---|---|
| 2,293,755 | 8/1942 | Joabson | 242/107 |
| 2,979,576 | 4/1961 | Huber | 242/107.7 X |
| 3,491,966 | 1/1970 | Curran et al. | 242/107 |
| 3,550,875 | 12/1970 | Settimi | 242/107.4 |
| 3,598,335 | 8/1971 | Seeger | 242/107.2 |
| 3,682,412 | 8/1972 | Kuszynski | 242/107.4 |
| 3,700,184 | 10/1972 | Francis | 242/107.4 |
| 3,973,786 | 8/1976 | Rogers, Jr. | 280/747 |
| 4,023,746 | 5/1977 | Magyar | 242/107.7 |
| 4,081,152 | 3/1978 | Henderson | 242/107.4 R X |

Primary Examiner—David M. Mitchell
Assistant Examiner—Norman L. Stack, Jr.
Attorney, Agent, or Firm—Charles E. Leahy

[57] ABSTRACT

An inertia locking seat belt retractor for winding a shoulder belt having one end mounted on the vehicle door to move the belt between stowed and restraining positions upon movement of the door. The retractor has a winding prevention mechanism including a pawl and ratchet for selectively blocking belt winding rotation of the belt reel to hold the belt extended at a set length to establish a slackened comfort condition relative the occupant. A manually actuatable control device has a normal condition blocking control of the pawl by a control disc frictionally clutched to the reel and is manually actuatable to release the pawl for control by the disc. The control disc actuates the pawl to provide the set length, defines a range of unwinding wherein the pawl is temporarily deactuated to permit subsequent rewinding to return the belt to the set length, and disengages the pawl upon still further unwinding rotation so that the pawl is deactuated upon belt unwinding during opening of the door. The manually actuatable control device may be operated to temporarily deactuate the pawl to allow belt unwinding. The pawl blocks return of the manually actuatable control device to the normal pawl blocking condition until belt unwinding causes the control disc to deactuate the pawl.

5 Claims, 12 Drawing Figures

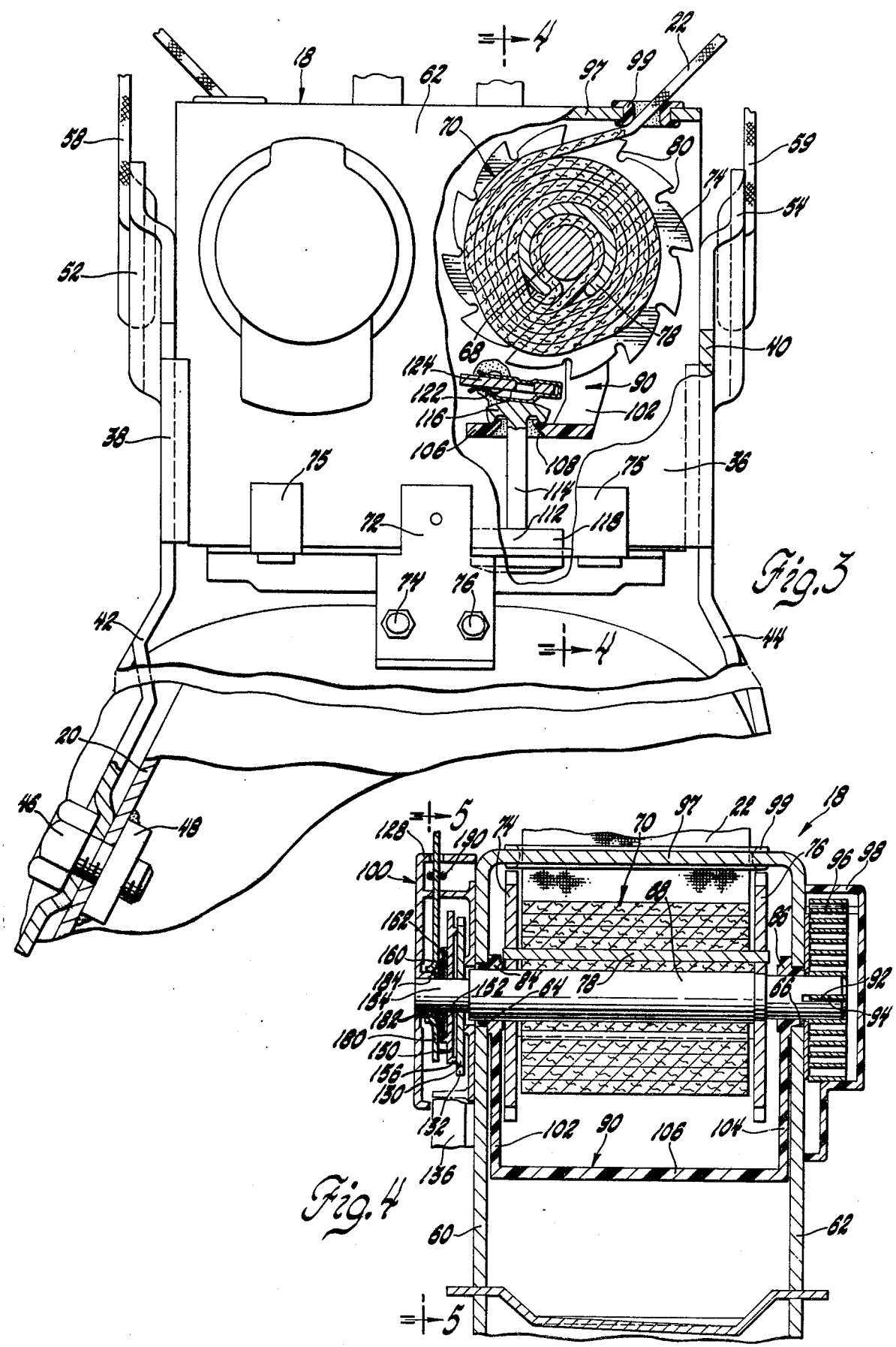

WINDING PREVENTION BELT RETRACTOR FOR PASSIVE SHOULDER BELT SYSTEM

The invention relates to a seat belt retractor and more particularly to a seat belt retractor having a manually actuated winding prevention mechanism for a door actuated passive belt system.

BACKGROUND OF THE INVENTION

It is well known to provide a motor vehicle occupant restraint system having a shoulder belt which extends over the shoulder and across the chest of the seated occupant. An inertia responsive seat belt retractor is conventionally associated with one end of the shoulder belt and has a windup spring which rotates a reel to wind or retract the belt to a taut condition across the chest of the occupant. The inertia retractor permits belt unwinding rotation of the reel to extend the belt as the occupant leans forwardly to reach the vehicle operating controls and locks the belt against extension in response to an acceleration stimulus experienced by the vehicle body.

It is also known to provide a retractor having a winding prevention mechanism which enhances occupant comfort locking the reel against belt winding rotation by the windup spring to hold the belt at a set length establishing a slackened condition about the occupant. U.S. Pat. No. 4,023,746, issued to Joseph J. Magyar on May 17, 1977, provides an inertia locking retractor having a winding prevention mechanism which is selectively actuated and deactuated in response to a predetermined sequence of reel rotation induced by movement of the restrained occupant.

U.S. Pat. No. 3,700,184, issued to R. E. Francis on Oct. 24, 1972 and U.S. Pat. No. 3,682,412, issued to G. G. Kuszynski on Aug. 8, 1972 provide inertia locking retractors having winding prevention mechanisms which are manually actuated and deactuated without regard to the condition or sequence of belt winding retraction or unwinding extension.

U.S. Pat. No. 3,973,786, issued to L. W. Rogers, Jr. on Aug. 10, 1976, discloses a winding prevention mechanism of the Magyar type which is interconnected with the door for deactuation whenever the door is in the open position to insure belt winding rotation.

It is also known to provide a passive belt system having one end of the belt mounted on the door, another end of the belt mounted on the vehicle body inboard the seat, and a retractor associated with one of the belt ends for winding the belt to a taut position about the occupant upon closing movement of the door and unwinding the belt to a stowed position forwardly of the seat upon opening movement of the door.

It would be desirable to employ a winding prevention retractor in a door responsive passive seat belt system to enhance occupant comfort. However, it has been found that the Magyar type winding prevention mechanism which is controlled in response to the predetermined sequence of belt winding and unwinding could be subject to unintended actuation of the winding prevention mechanism upon inadvertent random oscillatory movement of the door in the open position so that the belt would not be wound to the restraining position about the occupant upon closure of the door. The Francis or Kuszynski type retractor could be used in a door responsive passive belt system but it would be necessary for the occupant to manually set the winding prevention mechanism subsequent to movement of the belt to the restraining position by closure of the door and to also manually release the winding prevention mechanism. If the occupant did not manually release the winding prevention mechanism before opening the door or before a subsequent closure of the door, the retractor would reestablish the previously set belt length irrespective of a different occupant entering the seat or the seat position being adjusted. Accordingly, an excessive amount of slack could result. The Rogers type retractor having the winding prevention mechanism interconnected with the door could be used in a door responsive passive belt system but a remote interconnect would be required in those instances where it is desired to mount the retractor inboard the occupant seating position. Furthermore, the use of a Rogers type door interconnect would render the winding prevention mechanism immediately operative in response to belt unwinding subsequent to closure of the door, even in those instances where the occupant may not have assumed his final adjusted position in the seat prior to closing movement of the door or where the occupant may not require or desire the use of this comfort enhancing feature.

The present invention features a new and improved winding prevention mechanism which is manually actuated subsequent to winding of the belt to the restraining position by closure of the door and is automatically released in response to reel rotation upon unwinding of the belt during opening movement of the door to assure winding of the belt and complete movement to a taut restraining position upon subsequent closure of the door.

BRIEF SUMMARY OF THE INVENTION

An inertia locking seat belt retractor for winding a shoulder belt having one end mounted on the vehicle door to move the belt between stowed and restraining positions upon movement of the door. The retractor has a winding prevention mechanism including a pawl and ratchet for selectively blocking belt winding rotation of the belt reel to hold the belt extended at a set length to establish a slackened comfort condition relative the occupant. A manually actuatable control means has a normal condition blocking control of the pawl by a control disc frictionally clutched to the reel and is manually actuatable to release the pawl for control by the disc. The control disc actuates the pawl to provide the set length, defines a range of unwinding wherein the pawl is temporarily deactuated to permit subsequent rewinding to return the belt to the set length, and disengages the pawl upon still further unwinding rotation so that the pawl is deactuated upon belt unwinding during opening of the door. The manually actuatable control means may be operated to temporarily deactuate the pawl to allow belt unwinding. The pawl blocks return of the manual control means to the normal pawl blocking condition until belt unwinding causes the control disc to deactuate the pawl.

One object, feature and advantage of the invention resides in the provision of a winding prevention mechanism for a seat belt retractor which is actuated by manual deliberate effort of the seat occupant independently of reel rotation or door movement and which is automatically deactuated by predetermined belt unwinding.

Another object, feature and advantage of the invention resides in the provision of a manually actuated winding prevention mechanism for an inertia locking retractor in a door connected passive shoulder belt system which is automatically released in response to belt unwinding reel rotation during opening movement of the door to assure winding of the belt to a taut restraining position upon subsequent closure of the door.

A further object, feature and advantage of the invention resides in the provision of a manually actuated winding prevention mechanism for an inertia locking retractor in a door connected passive shoulder belt system having a frictionally driven control disc which is conditioned to measure unwinding rotation from the maximum obtained condition of belt windup and provide controlled actuation and deactuation relative thereto.

Brief Description of the Drawings

These and other features, objects and advantages of the invention will become apparent upon consideration of the specification and the appended drawings in which:

FIG. 3 is a rear view of the retractor assembly;

FIG. 4 is a sectional view taken in the direction of arrows 4—4 of FIG. 3;

Referring to FIG. 1, a vehicle body, generally indicated by numeral 10, has a front passenger seat 12 including a seat back 14 and an adjacent door 16. The vehicle body 10 also has a driver seat and adjacent driver door, not shown.

Figure 1:
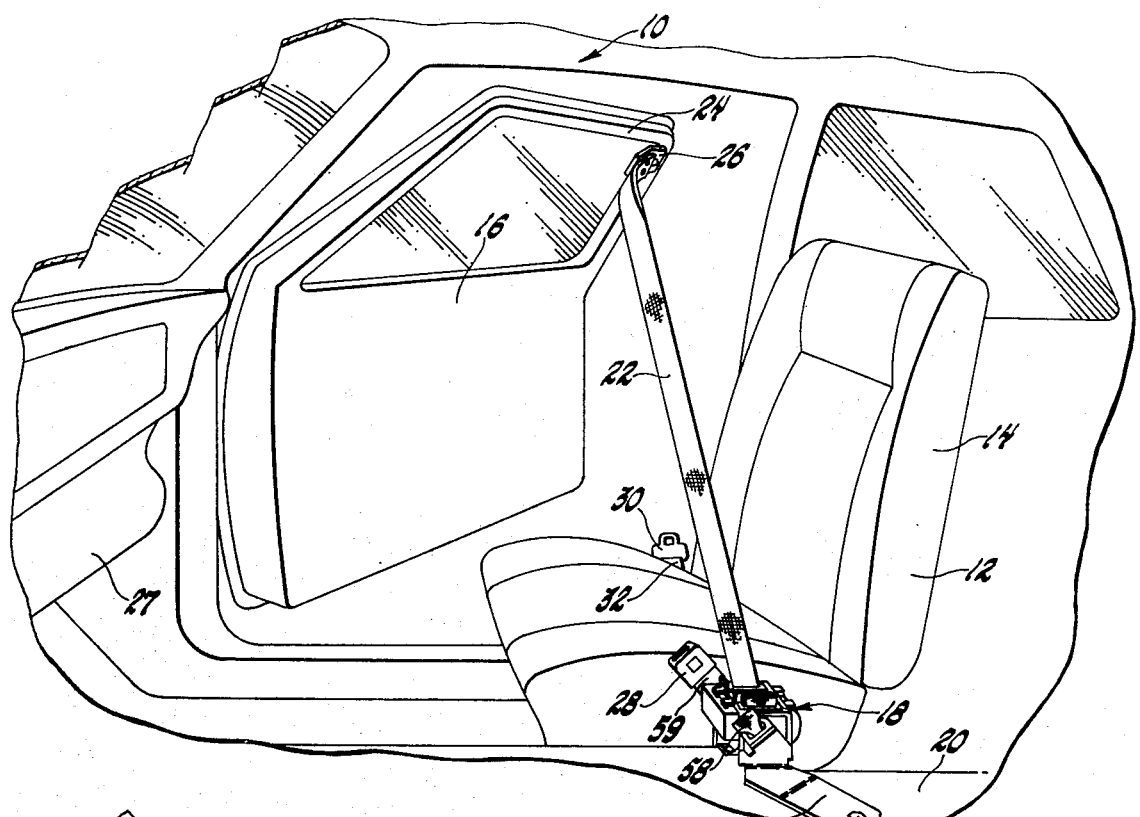
FIG. 1 is a partially broken away perspective view of a motor vehicle body having a restraint system and retractor assembly according to this invention.

A passive occupant restraint belt system associated with the seat 12 includes a retractor assembly generally indicated at 18 and mounted on the drive line tunnel 20 as will be more fully described hereinafter. The retractor assembly 18 has a spring wound reel and associated inertia locking mechanism which anchor the inboard end of a shoulder belt 22. The outboard end of the shoulder belt 22 is attached to the window frame 24 of door 16 by an anchor plate 26. Accordingly, when the door 16 is in the open position of FIG. 1, the shoulder belt 22 is unwound from the retractor assembly 18 and disposed somewhat forwardly of the seat back 14 to permit occupant ingress and egress. Upon closure of the door 16, the retractor assembly 18 winds the shoulder belt 22 to a taut restraining position across the chest of the seated occupant for restraint of the upper torso. The lower torso is restrained by a knee cushion 27 mounted beneath the instrument panel.

An active lap belt system is also provided and includes a buckle 28 attached to the retractor assembly 18 as will be described hereinafter. A lap belt 32 is mounted on the vehicle body floor outboard the seat 12 by a retractor and has a latch plate 30. The lap belt 32 is unwound from the retractor by the occupant to engage the latch plate 30 in the buckle 28 for restraint of the lower torso.

Referring again to FIG. 1, it will be understood that the retractor assembly 18 includes a second reel associated with the shoulder belt for the vehicle driver seat and mounts a buckle for the driver's active lap belt.

Figure 2:
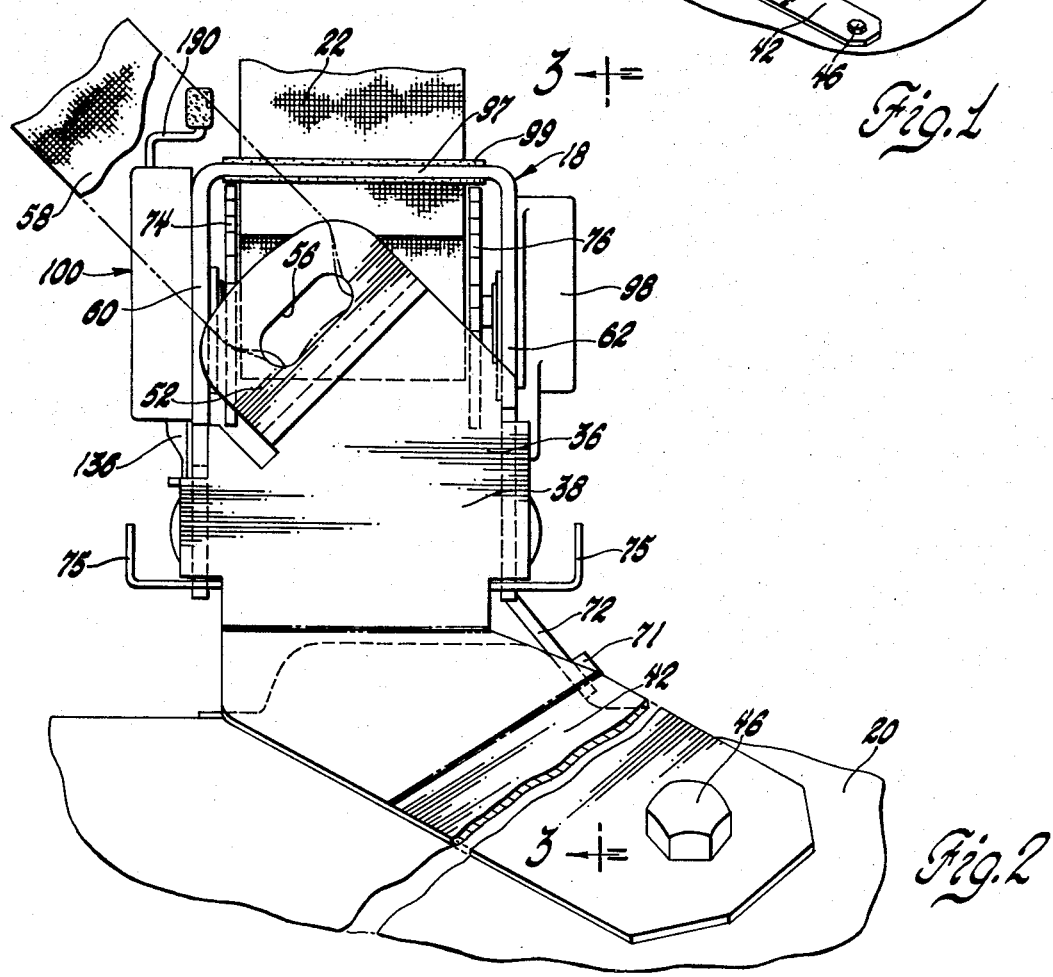
FIG. 2 is a side view of the retractor assembly.

Referring to FIGS. 2 and 3, it is seen that the retractor assembly 18 includes a stamped sheet metal housing 36 including laterally spaced sidewalls 38 and 40 having integral spaced apart stirrups 42 and 44 which straddle the drive line tunnel 20. A bolt 46 extends through a bolt hole in the stirrup 42 and threadedly engages a weld nut 48 located inside the drive line tunnel 20. A pair of buckle anchorages 52 and 54 are respectively struck from the sidewalls 38 and 40 of the housing 36. As seen in FIG. 2, the anchorage 52 has an elongated aperture 56 which receives a short length of belt 58 which mounts the buckle for the driver lap belt. A similar aperture is provided in anchorage 54 to receive a short length of belt 59 which mounts the buckle for the driver lap belt.

The retractor housing 36 also has spaced apart forward and rearward walls 60 and 62. As best seen in FIG. 4, the walls 60 and 62 have apertures 64 and 66 which receive the ends of a reel shaft 68 which mounts a shoulder belt reel, generally indicated at 70. Like apertures are provided for rotatably mounting a reel for winding the shoulder belt for the driver seat. A bracket 72 is welded to the rearward wall 62 and is attached to the tunnel 20 by bolts 71 and 73. The housing 36 also has brackets 75 which facilitate attachment of a decorative plastic housing, not shown, to enhance the appearance of the retractor assembly 18.

As best seen in FIGS. 3 and 4, the belt reel 70 rotatably mounted by the reel shaft 68 includes an elongated drum 78 having ratchet plates 74 and 76 attached to the ends thereof and keyed to the reel shaft 68 for rotation therewith. The ratchet plates 74 and 76 have teeth 80 that face in a clockwise belt unwinding direction of reel rotation as viewed in FIG. 3. The ends of the reel shaft 68 are rotatably supported within the apertures 64 and 66 of the housing walls 60 and 62 by bushing portions 84 and 86 of a pendulum support member, generally indicated at 90. The FIG. 4 right-hand end of reel shaft extends outwardly through the housing wall 62 and has a slot 92 which receives the inner end 94 of a windup spring 96. The outer end of spring 96 is suitably fixed to a plastic spring housing 98 mounted on the housing wall 62. The spring 96 urges rotation of the belt reel 70 in the belt winding direction to store the belt 22. The left-hand end of reel shaft 68 extends outwardly through the adjacent housing wall 60 and is received by a winding prevention mechanism generally designated by 100. A top wall 97 of housing 36 has an escutcheon 99 seated in a slot to guide the belt 22 onto the reel 70.

The pendulum support member 90 is of injection molded plastic and includes depending legs 102 and 104 which extend downwardly from their respective bushing portions 84 and 86 encircling the ends of reel shaft 68. The lower ends of legs 102 and 104 are connected by an integral base 106 which is oriented in a horizontal plane. Base 106 has an aperture 108 which receives a stem 114 of a pendulum 112 which mushrooms outwardly above the base 106 into a control portion 116. A weight 118 is supported on the lower end of the stem 114. The control portion 116 is engaged by an adjustment clip 122 attached to a lock bar 124 which is pivotally supported on the pendulum support member 90 for movement into locking engagement with the ratchet teeth 80 of the ratchet plates 74 and 76. For a complete description of a preferred arrangement of the pendulum support member 90 and lock bar 124, reference may be had to U.S. patent application Ser. No. 809,193 by James C. Degras et al, filed June 23, 1977, and assigned to the assignee of this invention.

In operation the pendulum 112 swings from its vertically depending orientation of FIG. 3 to an inclined position in response to abrupt vehicle acceleration or deceleration in any horizontal direction. Swinging movement of the pendulum 112 causes the pendulum control portion 116 to pivot the lock bar 124 upwardly so that locking portions on the lock bar 124 engage the ratchet teeth 80 of ratchet plates 74 and 76 to lock the reel 70 against belt unwinding rotation. When the vehicle acceleration or deceleration terminates, the pendulum 112 returns to its vertical position and allows the lock bar 124 to pivot downwardly out of engagement with the reel ratchet teeth 80 so that belt unwinding is again permitted. Since the lock bar 124 is the only restraint against unwinding reel rotation, the belt 22 can normally by unwound by the occupant leaning forward in the seat, by pulling on the belt, by moving the door 16 to the open position or by adjusting the seat forward.

Figure 5:
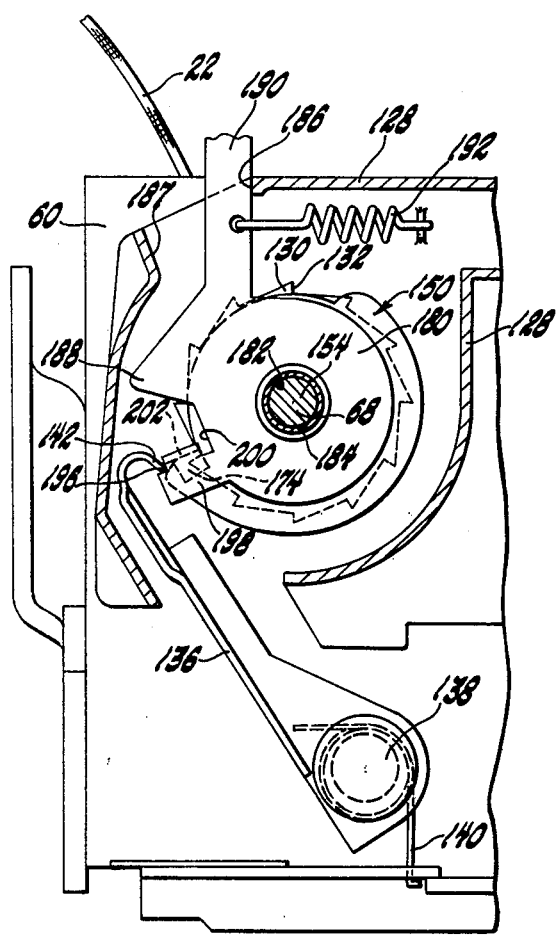
FIG. 5 is a sectional view taken in the direction of arrows 5—5 of FIG. 4 showing the belt wound on the reel and the winding prevention pawl in a blocked-out condition.

Referring to FIGS. 4 and 5, it is seen that the winding prevention mechanism 100 includes a housing cover 128 that is fixedly mounted on the adjacent housing wall 60. A ratchet plate 130 is suitably fixed to the reel shaft 68 for rotation with the reel 70 in both the belt winding and unwinding directions of rotation. The ratchet plate 130 has ratchet teeth 132 which face in the clockwise belt winding direction of reel rotation, as viewed in FIG. 5, oppositely of the direction of the ratchet teeth 80 on the ratchet plates 74 and 76.

Referring to FIG. 5, a winding prevention pawl 136 is provided for engagement with the ratchet teeth 132 to block belt winding rotation of the reel 70 by the windup spring 96. The pawl 136 is pivoted to the housing wall 60 by a pivot shaft 138. A torsion spring 140 encircles the pivot shaft 138 and acts between the housing wall 60 and the pawl 136 to urge a pawl tooth 142 in the direction toward engagement with the ratchet teeth 132. A control disc 150 for controlling the pawl has a central aperture 152 which rotatably receives a reduced diameter end portion 154 of the reel shaft 68. A peripheral annular rib 156 of the control disc 150 is held in frictional driving engagement with the face of ratchet plate 130 by a suitable compression spring 160 which acts between the housing cover 128 and an annular rib 162 on the control disc 150.

Figure 12:
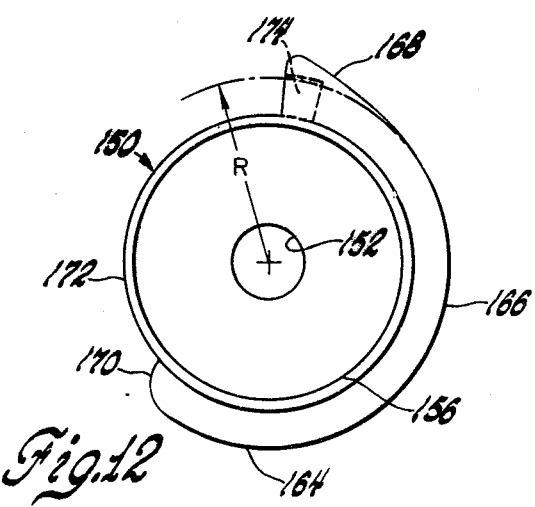
FIG. 12 is an end view of the control disc.

FIG. 12 shows the configuration of the control disc 150 when viewed in an axial direction. The outer peripheral edge 164 of control disc 150 has a control surface 166 which extends over about 220° of the circumference of the disc. One end of the control surface 166 has a cam surface 168 which rises radially of the control surface radius designated "R" in FIG. 12. The other end 170 of the control surface 166 is rounded as seen in FIG. 12, and cooperates with the radially raised cam surface 168 to define a notch 172 which extends circumferentially over approximately 140° of the peripheral edge 164 of the disc 150. As seen in FIG. 5, the control surface 166 of the control disc 150 is located radially outwardly of the ratchet teeth 132 and support the pawl tooth 142 in a disengaged position relative the ratchet teeth 132. The notch 172 is located radially inward of the ratchet teeth 132 to expose several of the ratchet teeth 132 for engagement by the pawl tooth 142. The cam surface 168 is located further radially outward from the control surface 166 to move the pawl tooth 142 to a furthest disengaged position. The control disc 150 also has a lateral projection 174 which extends laterally from the face of control disc 150 adjacent the cam surface 168 for limiting rotation of the control disc to one revolution as will be discussed hereinafter.

The winding prevention mechanism 100 also includes an actuating member 180 having a central aperture 182 which is rotatably journalled on a cylindrical abutment 184 of the cover. Referring to FIG. 5, it is seen that the housing cover 128 has a pair of stops 186 and 187 which are engageable by a handle portion 190 of the actuating member 180 to limit the rotation of the actuating member 180. A spring 192 acts between the handle portion 190 and the housing wall 60 to normally establish the actuating member 180 in the position of FIG. 5 wherein the pawl tooth 142 is seated in a notch 196 of a tab 198 of actuating member 180 to support the pawl tooth 142 against movement toward the ratchet teeth 132. The actuating member 180 also has a notch 200 adjacent the tab 198 and carried into alignment with the pawl tooth 142 upon counterclockwise rotation of the actuating member 180 to the position of FIG. 8 to allow radial inward movement of the pawl tooth 142 toward engagement with the ratchet teeth 132. The actuating member 180 also has a cam portion 188 which is carried into engagement with the pawl tooth 142 upon further counterclockwise rotation of the actuating member 180 to lift the pawl tooth 142 radially outward to the position of FIG. 11 wherein the pawl tooth 142 is disengaged from the ratchet teeth 132 to permit belt winding reel rotation. The actuating member has a lateral flange 202 which extends into lateral interference with the lateral projection 174 of control disc to limit rotation of the control disc.

Operation

Figure 6:
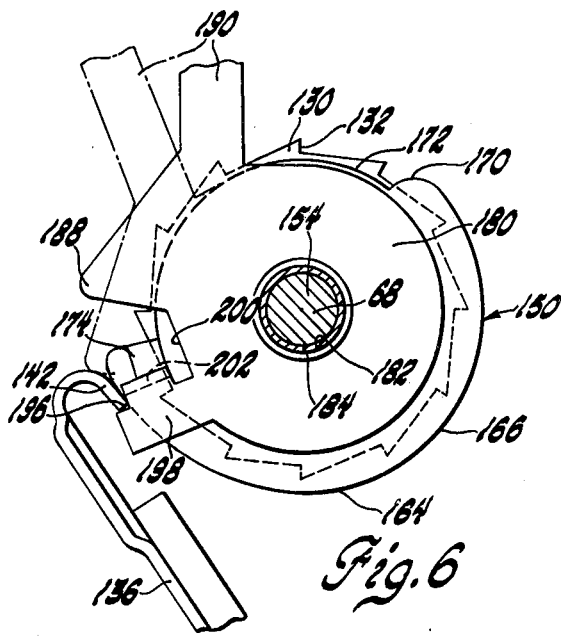
FIG. 6 is a view similar to FIG. 5 but showing the winding prevention mechanism with the belt unwound somewhat from the position of FIG. 5.

The manner in which the control disc 150 and the actuating member 180 cooperate to control the engaged and disengaged positions of the pawl tooth 142 with ratchet teeth 132 will now be described by first referring to FIGS. 1 and 6 in which the door 16 is open and the belt is fully unwound from the reel 70. As seen in FIG. 6, the previous unwinding rottion of the reel as the door 16 is opened carries the control disc to its limit of rotation in the unwinding direction wherein the control disc lateral projection 174 engages the lateral flange 202 of the actuating member 180. The effort of spring 192 exceeds the friction force on the control disc 150 to assure that the control disc does not rotate the actuating member 180.

As the occupant enters the seat 12 and closes the door 16, the belt 22 is wound on the reel 70 by the windup spring 96. The initial rotation of the reel 70 in the winding direction causes the control disc 150 to rotate from its FIG. 6 unwinding limit of rotation to the FIG. 5 winding limit of rotation wherein the control disc lateral projection 174 engages the lateral flange 202 of the actuating member 180. The frictional drive provided by spring 160 allows control disc 150 to idle at the position of FIG. 5 during continued belt winding rotation of the reel 70 as the door 16 is latched and the occupant settles against the seat back 14 of the seat 12. A subsequent unwinding of the belt 22 by forward leaning movement of the occupant will initiate rotation of the control disc 150 with the reel 70 in the unwinding direction, but the control disc 150 will rewind with the reel 70 upon subsequent belt windup and will idle at the winding limit of rotation if the occupant leans further rearwardly or adjusts the seat rearwardly so that the control disc 150 is conditioned to initiate its subsequent unwinding rotation from the maximum obtained condition of belt windup.

Figure 8:
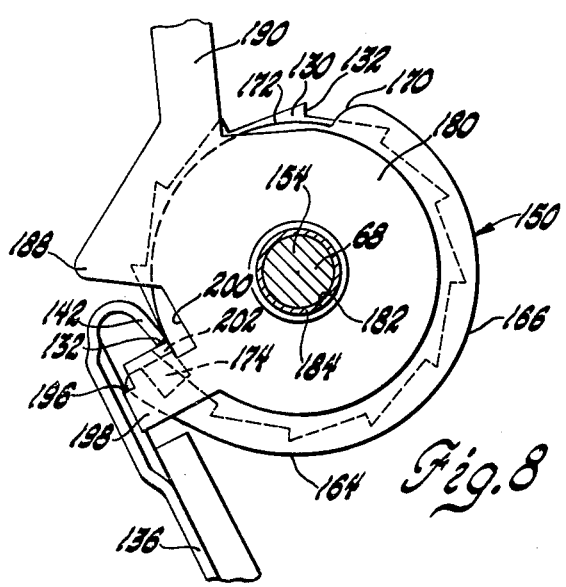
FIGS. 7 and 8 are similar to FIG. 5 but show the pawl lowered into engagement with the ratchet teeth to prevent belt winding reel rotation to maintain a set length of belt.
Figure 7:
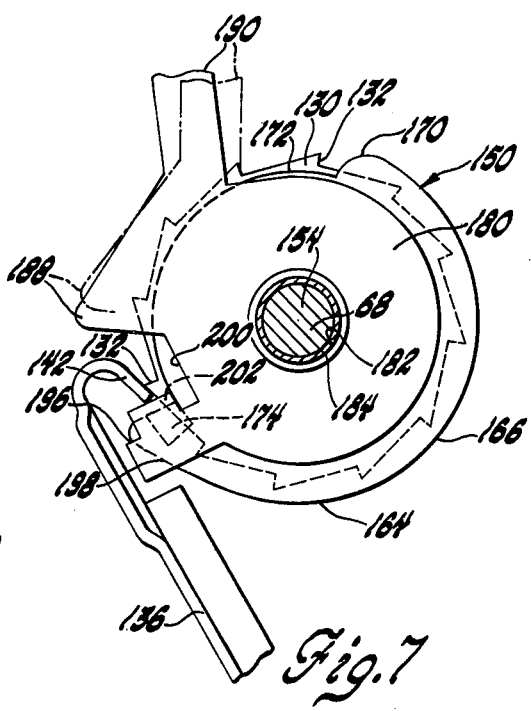

During such winding and unwinding of the belt, the pawl tooth 142 is poised in its FIGS. 5 and 6 position of disengagement from the ratchet teeth 132 by capture in the notch 196 of the actuating member tab 198. If and when the occupant desires to relieve the tautness on the belt 22 to enhance his comfort, the actuating member 180 is rotated in the counterclockwise direction by manual actuation of the handle portion 190. Such actuation, as seen in FIG. 7, rotates the actuating member tab 198 out of engagement with the pawl tooth 142 allowing the pawl spring 140 to pivot the pawl 136 and carry the pawl tooth 142 into engagement with the aligned ratchet tooth 132. If the pawl tooth 142 comes to rest on the inclined portion of the ratchet tooth 132, as seen in FIG. 7, the windup spring 96 is allowed to rotate reel 70 somewhat in the winding direction or the occupant may unwind the belt further so that the pawl tooth 142 engages the vertical face of one of the ratchet teeth 132, as seen in FIG. 8. As seen in FIG. 8, the pawl tooth 142 engages the actuating member lateral flange 202 to block spring 192 from returning the actuating member 180 to the normal position engaging stop 186. Thus, the engagement of pawl tooth 142 with ratchet teeth 132 locks the reel 70 against rotation in the belt winding direction by the windup spring 96.

Figure 9:
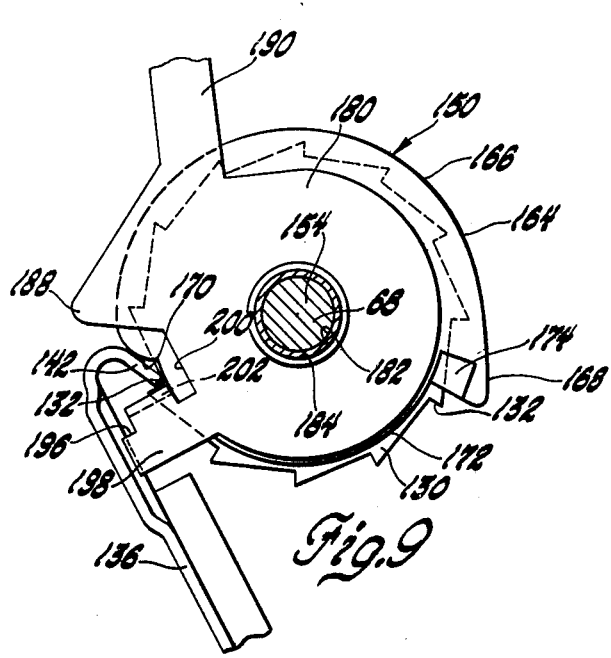
FIG. 9 shows the belt unwound somewhat from the position of FIG. 8 to introduce additional slack in the belt.

FIG. 8 shows the pawl tooth 142 engaged with the first available ratchet tooth 132 exposed by notch 172 of control disc 150 and notch 200 of actuating member 180. Unwinding rotation of the reel 70 upon forward leaning movement of the occupant or by the occupant pulling the belt causes the pawl tooth 142 to ratchet over the ratchet teeth 132 exposed by the control disc notch 172 as the ratchet plate 130 and control disc 150 rotate in the counterclockwise belt unwinding direction. FIG. 9 shows the pawl tooth 142 engaged with the last available ratchet tooth 132 prior to engagement of the pawl tooth 142 by the rounded end 170 of the control surface 166. Thus, the circumferential extent of notch 172 defines a range of one-way reel rotation to introduce additional increments of slack into the belt.

Figure 10:
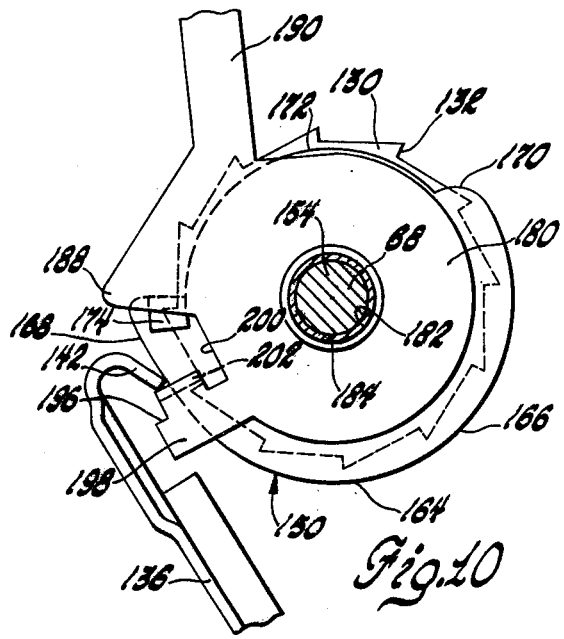
FIG. 10 is a view similar to FIG. 9 but showing further unwinding rotation wherein the pawl is held in a temporarily deactuated position to permit subsequent rewinding of the belt.

A further unwinding rotation of the reel 70 causes the rounded end 170 to lift the pawl tooth 142 radially outward to the position of FIG. 10 wherein the pawl tooth 142 is disengaged from the ratchet teeth 132 but remains in blocking engagement with the lateral flange 202 of the actuating member 180. When the unwinding effort is relieved from the belt 22, as for example when the occupant leans back against the seat back 14, the windup spring 96 rotates the reel 70 in the clockwise direction to rewind the belt 22 and return the control disc 150 and ratchet plate 130 to the position of FIG. 9 wherein the rounded end 170 lowers the pawl tooth 142 into engagement with the last available ratchet teeth exposed by control disc notch 172.

Upon unwinding rotation of the reel 70 and control disc 150 beyond the position of FIG. 10, the cam surface 168 of the control disc 150 moves pawl tooth 142 further radially outward to the position of FIG. 6 in which the pawl tooth 142 is disengaged from the lateral flange 202 of the actuating member 180 permitting spring 192 to rotate the actuating member 180 in the clockwise direction to again capture the pawl tooth 142 in the notch 196 of the control disc tab 198. Accordingly, unwinding rotation of the reel through about 360° of rotation to the unwinding limit of control disc rotation cancels the winding prevention mechanism. Thus, whenever the vehicle door 16 is moved to the open position and the belt 22 is unwound substantially from the reel 70, winding prevention mechanism is cancelled by the control disc rotation so that windup of the belt 22 by the reel windup spring 96 is assured during a subsequent closing movement of the door. Furthermore, the occupant may cancel the winding prevention mechanism whenever desired by simply unwinding the belt 22 sufficiently to carry the cam surface 168 into engagement with the pawl tooth 142.

Figure 11:
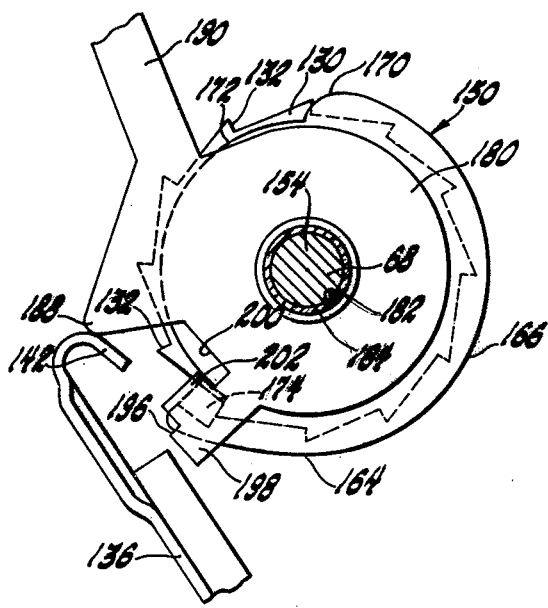
FIG. 11 is a view showing the pawl manually lifted to an intermittent deactuated position to permit belt windup.

Referring to FIG. 11, the pawl 136 may be manually deactuated by rotating the actuating member 180 in the counterclockwise direction to the position of FIG. 11 wherein the cam portion 188 engages and lifts the pawl tooth 142 radially outwardly from engagement with the ratchet teeth 132. This manual release mode of operation shown in FIG. 11 may be advantageously employed under several operating circumstances. For example, the occupant may wish to reduce the amount of slack in the belt from the condition corresponding to the FIG. 9 engagement with the last available ratchet tooth 132 by momentarily disengaging the pawl tooth 142 from the ratchet teeth 132 and reengaging the pawl tooth 142 in the position of FIG. 8. Furthermore, the occupant may wish to adjust the seat 12 in the rearward direction and reset the control disc 150 relative the reel 70 to obtain a new starting point of maximum obtained belt windup. Furthermore, it may be desirable to manually release the winding prevention mechanism if inadvertently actuated when the door 16 is in the open position and a further unwinding rotation sufficient to disengage the pawl 136 by the cam surface 168 of the control disc 150 cannot be achieved.

An important feature of this invention is that the winding rotation of the reel during closure of door and any further winding movement as the occupant leans back against the seat and/or adjusts the seat rearwardly will establish the control disc 150 at a winding limit of rotation corresponding to the maximum obtained condition of belt windup. During subsequent belt unwinding, the control disc 150 rotates with the reel to measure the extent of belt winding from the maximum obtained condition of belt windup. Thus, if the occupant actuates the handle portion 190 subsequent to an unwinding of the belt corresponding to movement of the control disc 150 to the position of FIG. 10, the control surface 166 supports the pawl tooth 142 against engagement with a pawl tooth 132 which would result in an introduction of an excessive amount of belt slack when the occupant returns rearwardly to the normal position against the backrest.

The configuration of the control disc 150 may be modified to obtain a desired control of the pawl. For example, it may be desired to change the circumferential extent of the notch 172 in order to obtain a desired range of permissible one-way reel rotation to introduce additional increments of slack from the first obtained set length. Furthermore, it may be desirable to modify the circumferential extent of the control surface 166 in order to obtain the desired range of permissible further belt unwinding beyond the one-way ratchet range when the pawl 136 is temporarily deactuated but continues to block return of the actuating member 180 to its normal position blocking the pawl from control by the control disc 150. It may also be desired to vary the location of the cam surface 168 relative the notch 172 and/or lateral projection 174 in order to modify the point of unwinding at which the pawl is lifted to its furthest outward condition and disengaged from the actuating member lateral flange 202 to permit the spring 192 to return the actuating member 180 to its position blocking the pawl 142.

Thus, the invention provides a new and improved winding prevention mechanism for a door actuated passive seat belt system.

The embodiments of the invention in which an exclusive property or privilege is claimed are defined as follows:

1. In combination, an automotive vehicle having a door, an occupant seat, a restraint belt for restraining the occupant in the seat, a reel having the belt wound thereon, a winding spring urging reel winding rotation to retract the belt to a stored position on the reel and pull the belt taut against the occupant, a locking mechanism effective to prevent belt extension only in response to a sensed acceleration condition a pawl and ratchet associated with the reel, a reel driven control means operative in response to a predetermined sequence and extent of reel rotation to control movement of the pawl between retraction permitting disengagement with the ratchet and retraction preventing engagement with the ratchet to hold the belt extended at a set length with respect to the seat, means normally establishing the pawl in the disengaged position irrespective of operation of the reel driven control means to a condition otherwise engaging the pawl with the ratchet, manual control means being manually actuatable by the occupant independently of occupant movement of the door and belt to establish the pawl in a condition for control by the reel driven control means, said reel driven control means being effective to disengage the pawl in response to predetermined unwinding rotation of the reel subsequent to engagement of the pawl and return the pawl to the normal disengaged condition to permit subsequent belt winding and unwinding rotation irrespective of the condition of the reel driven control means and until a subsequent actuation of the manual control means by the occupant.

2. In combination, an automotive vehicle having an occupant seat, a restraint belt for restraining the occupant in the seat, a reel having the belt wound thereon, a winding spring urging reel winding rotation to retract the belt to a stored position on the reel and pull the belt taut against the occupant when the belt is disposed in restraining position about the occupant, a locking mechanism effective to prevent belt extension only in response to a sensed acceleration condition, a detent mechanism effective when actuated to block winding rotation of the reel by the winding spring to hold the belt extended at its then length against the urging of the winding spring, control means driven by rotation of the reel and adapted for selective cooperable association with the detent mechanism to control actuation of the detent mechanism, manual control means responsive to operator actuation and having a normal condition blocking control of the detent mechanism by the reel driven control means and being manually actuatable to initiate cooperable association between the detent mechanism and the reel driven control means, said reel driven control means being effective to permit actuation of the detent mechanism upon establishment of a predetermined angular relationship between the detent mechanism and the reel driven control means, means acting between the manual control means and detent mechanism to block return of the manual control means to the normal condition subsequent to establishment of said cooperable association, said manual control means being intermittently actuatable by the operator to a further position temporarily deactuating the detent mechanism to permit belt retraction, and said reel driven control means further including means for deactuating the previously actuated detent mechanism in response to a predetermined extension of the belt subsequent to said actuation and for effecting return of the manual control means to the normal condition blocking control of the detent mechanism by the reel driven control means.

3. In combination, an automotive vehicle having an occupant seat, a restraint belt for restraining an occupant in the seat, a reel for storing the belt and having a winding spring urging belt winding reel rotation to retract the belt on the reel and tension the belt against the occupant, a locking mechanism effective to prevent belt extension only in response to a sensed acceleration condition, a detent mechanism effective when actuated to prevent belt winding reel rotation by the winding spring and relieve the tension on the belt to hold the belt extended at a set length with respect to the occupant, control means rotatably mounted and having a surface cooperably associated with the detent mechanism to control actuation of the detent mechanism, means for limiting rotation of the control means to less than one revolution between a first limit at which rotation of the control means in the unwinding direction is stopped and a second limit at which rotation of the control means in the winding direction is stopped, friction clutch means acting between the control means and the reel to rotate the control means with the reel in both directions and allow the control means to stop at said limits, the cooperable association between the control means and the detent mechanism being such that the detent mechanism is actuated over a first range of angular positions of the control means upon belt unwinding rotation from the limit of winding rotation to relieve belt tension by preventing winding reel rotation, and said cooperable association being such that upon further belt unwinding rotation the detent mechanism is temporarily deactuated over a second range of angular positions of the control means so as to permit subsequent limited winding rotation of the reel and retrograde rotation of the control means to within the first range of angular positions to reactuate the detent mechanism and relieve the belt tension, said cooperable association being further effective upon unwinding rotation beyond the second range of angular positions to deactuate the detent mechanism to permit belt windup by the winding spring, and a manual actuatable control means actuatable independently of movement of the door and belt associated with the detent means and being effective subsequent to deactuation of the detent mechanism by said unwinding rotation beyond the second range to block the cooperable association between the control means and the detent mechanism so that the condition of the detent means is unaffected by belt winding and unwinding reel rotation, said manual control means being selectively actuatable to initiate the cooperable association between the control means and the detent means.

4. In combination, an automotive vehicle having a door, an occupant seat, a restraint belt for restraining the occupant in the seat, means coupling the belt with the door to move the belt to a stored position upon opening the door and move the belt to a restraining position upon closing the door, a reel having one end of the belt wound thereon, a winding spring urging reel winding rotation to retract the belt and pull the belt taut against the occupant when the belt is moved to the restraining position upon closing of the door, a locking mechanism preventing belt extension only in response to a sensed acceleration condition, a pawl and ratchet associated with the reel, a control disc rotatably mounted on the reel and being operative to control movement of the pawl between retraction permitting disengagement with the ratchet and retraction permitting engagement with the ratchet to hold the belt extended at a set length with respect to the seat, means for limiting rotation of the disc relative the reel between a limit of rotation in the unwinding direction and a limit of rotation in the winding direction, friction clutch means for rotating the disc with the reel in both directions and allowing the disc to stop at the limits of rotation, winding of the belt by the reel during belt movement to the restraining position upon closure of the door effecting rotation of the disc to the limit of winding rotation so that the disc is conditioned to begin subsequent unwinding rotation from the maximum obtained condition of belt retraction and corresponding tautness of the belt about the occupant, manual control means responsive to operator actuation independently of operator movement of the door and belt and having a normal condition blocking control of the pawl by the disc and being manually actuatable to release the pawl for control by the disc, said disc being effective to engage the pawl upon predetermined unwinding rotation from the limit of winding rotation of the disc corresponding to the maximum obtained conditioning belt windup to prevent belt winding rotation and establish a measured permissible slackened condition relative the maximum obtained condition of windup, said control disc being further effective to disengage the pawl in response to a predetermined further unwinding rotation toward the unwinding limit upon opening movement of the door and returning the manual control means to the normal condition blocking control of the pawl by the control disc so that the belt winding effort of the winding spring is restored to assure winding of the belt to taut condition about the occupant upon subsequent closure of the door.

5. In combination, an automotive vehicle having a door, an occupant seat, a restraint belt for restraining the occupant in the seat, means coupling the belt with the door to move the belt to a stowed position upon opening the door and move the belt to a restraining position upon closing the door, a reel having one end of the belt wound thereon, a winding spring urging reel winding rotation to retract the belt and pull the belt taut against the occupant when the belt is moved to the restraining position upon closing of the door, a locking mechanism preventing belt extension only in response to a sensed acceleration condition, a pawl and ratchet associated with the reel, a control disc rotatably mounted on the reel and being operative to control movement of the pawl between retraction permitting disengagement with the ratchet and retraction preventing engagement with the ratchet to hold the belt extended at a set length with respect to the seat, means for limiting rotation of the disc relative the reel between a limit of rotation in the unwinding direction and a limit of rotation in the winding direction, friction clutch means for rotating the disc with the reel in both directions and allowing the disc to stop at the limits of rotation, winding of the belt by the reel during movement to the restraining position upon closure of the door and upon any subsequent further belt winding effecting rotation of the disc to the limit of winding rotation so that the disc is conditioned to begin subsequent unwinding rotation from the maximum obtained condition of belt retraction and corresponding tautness of the belt about the occupant, manual control means responsive to operator actuation independent of operator movement of the door and belt and having a normal condition blocking control of the pawl by the disc and being manually actuatable to initiate control of the pawl by the disc, said disc being effective to define a range of unwinding rotation from the limit of winding rotation within which pawl engagement is permitted to prevent belt winding rotation and establish a slackened condition relative the maximum obtained condition of windup, said disc being further effective to prevent pawl engagement and disengage a previously engaged pawl upon unwinding rotation beyond said defined range to thereby prevent the introduction of an excessive slackened condition of the belt relative the maximum obtained condition of windup and permit subsequent spring induced winding rotation to within the defined range and engage the pawl to reestablish a slackened condition, said control disc being further effective to disengage the pawl in response to unwinding rotation of the disc approaching the limit of unwinding rotation and effecting return of the manual control means to the normal condition blocking control of the pawl by the control disc, said manual control means being intermittently actuatable by the operator to a position temporarily disengaging the previously disengaged pawl to permit belt retraction toward and beyond the previously obtained maximum condition of belt tautness.

* * * * *